United States Patent Office 3,658,875
Patented Apr. 25, 1972

3,658,875
PROCESS FOR PREPARING AROMATIC ALDEHYDES AND THE CORRESPONDING ALCOHOLS
Jean Claude Brunie, Michel Costantini, and Noel Crenne, Lyon, and Michel Jouffret, Villeur Banne, Rhone, France, assignors to Rhone-Poulenc S.A., Paris, France
No Drawing. Filed Mar. 13, 1969, Ser. No. 807,128
Claims priority, application France, Mar. 14, 1968, 143,796
Int. Cl. C07c 121/50, 47/52
U.S. Cl. 260—465 R        7 Claims

ABSTRACT OF THE DISCLOSURE

Mixtures of aromatic aldehydes and the corresponding alcohols are made by heating the corresponding aromatic hydroperoxide in the presence of an organic base and a chromium compound.

---

This invention provides a process for the preparation of mixtures of aromatic aldehydes with their corresponding alcohols.

For many years the preparation of aromatic aldehydes, such as benzaldehyde, has been carried out by hydrolysing an aromatic compound containing a dichloromethyl substituent. However, the aldehydes prepared in this way are contaminated with corrosive chlorine-containing impurities and require laborious purification if they are intended for high-class use, for example, in cosmetics and perfumes.

French Pat. 1,366,078 has described a process for the preparation of benzyl alcohol and of benzaldehyde which is free from these disadvantages. According to this process, toluene is oxidised with air in the liquid phase in the absence of a catalyst at a temperature from 170° to 220°; and the reaction mixture is then heated from 180° to 200° to decompose the hydroperoxide formed. This process leads to an overall good yield of benzyl alcohol and benzaldehyde but benzyl alcohol is the predominant product.

The present invention provides a process by which it is possible to prepare mixtures consisting essentially of an aromatic aldehyde and of the corresponding alcohol and containing a major proportion of aldehyde.

This new process comprises heating a solution of a primary araliphatic hydroperoxide of general formula:

$$\text{Ar—CH}_2\text{—OOH} \qquad (I)$$

in which the symbol Ar represents a monovalent, substituted or unsubstituted aromatic radical, in the presence of an organic base and of a chromium compound which is soluble in the solvent employed.

Examples of hydroperoxides which can be used in the invention are those in which the radical Ar has the formula:

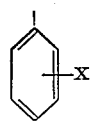

(II)

wherein X represents hydrogen, halogen, alkyl of one to four carbon atoms, e.g. methyl or t-butyl, alkoxy of one to four carbon atoms, e.g. methoxy, nitrile (—CN) or nitro. The radical Ar may alternatively have the formula:

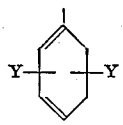

(III)

wherein Y represents an alkyl radical of one to four carbon atoms, e.g. methyl or t-butyl.

Preferred hydroperoxides include benzyl hydroperoxide, p-methylbenzyl hydroperoxide, p-methoxybenzyl hydroperoxide, p-cyanobenzyl hydroperoxide and 3,5-dimethylbenzyl hydroperoxide.

The compounds used as solvents in the invention are preferably hydrocarbons free of unsaturation other than aromatic unsaturation and may be aliphatic, aromatic or alicyclic liquid hydrocarbons, for example, alkanes of 6 to 20 carbon atoms, cycloalkanes of 6 to 16 carbon atoms in the ring and optionally substituted by alkyl of 1 to 4 carbon atoms, benzene and its derivatives which are monosubstituted or polysubstituted by halogen, alkyl of 1 to 4 carbon atoms, alkoxy of 1 to 4 carbon atoms, nitrile (—CN) or nitro, or by a phenyl radical derived from ArH, where Ar is as defined hereinbefore. Aromatic hydrocarbons with condensed nuclei which may be partially or completely hydrogenated, such as tetrahydronaphthalene and decahydronaphthalene, may also be used.

The concentration of the hydroperoxide in the solvent can vary within quite a wide range without affecting the yield of the desired products. As a general rule there are no obligatory limits and the conditions employed rather represent a compromise between economic and technological reasons intended to reduce the volume of the equipment to the maximum extent, and at the same time avoid excessive and difficult-to-control evolution of heat. In practice, hydroperoxide concentrations ranging from 2% to 20% by weight relative to the hydrocarbon are generally very suitable.

The organic bases used in the invention may be aliphatic, alicyclic, aromatic or heterocyclic amines having at least one secondary or tertiary nitrogen atom, for example, pyridine and its homologues such as picolines, lutidines and collidines, bipyridyl, piperidines, quinoline, isoquinoline, acridine, morpholine, phenothiazine, pyrimidine, pyrazine, piperazine and dialkylanilines. They are used in concentrations generally from 1% to 15% by weight and preferably from 3% to 10% by weight of the hydroperoxide employed.

The chromium compounds used in the invention preferably have a solubility of at least 0.1 g./litre at ambient temperature in the solvent employed, for example, chromium (III) carboxylates, such as chromic octanoate, naphthenate and stearate; chromium (VI) esters, such as di-t-butyl chromate; chromium 1,3-ketoenolates, such as chromium (III) acetylacetonate; chromium carbonyl derivatives, such as chromium (O) hexacarbonyl, or the complex formed by chromium (VI) oxide with nitrogen containing bases, such as $\text{CrO}_3.(\text{C}_5\text{H}_5\text{N})_2$; chromium (VI) carboxylates, such as chromyl acetate.

The amount of combined chromium introduced into the reaction medium in the form of a soluble compound may vary over a wide range; satisfactory reaction speeds are obtained with amounts of combined chromium ranging from 0.01 to 1.5 g. per kg. of hydroperoxide employed, the range being taken at the reaction temperature employed, generally 50° to 180° C., and preferably 70° to 160° C.

In practice, the hydroperoxide solution containing the catalysts is heated to a suitable temperature to carry out the new process. Since the reaction is exothermic, the temperature can thereafter be regulated by any regulating system suitable for removing the heat generated by the reaction. Depending on the nature of the catalysts, their amount and the temperature employed, the reaction time can vary from several minutes to several hours. When the temperature employed is above the boiling point of the mixture, the reaction can be carried out in an apparatus kept under pressure; the solution can optionally be kept in the liquid phase by introducing an inert gas such as nitrogen or argon under pressure. The aldehyde and alcohol can be separated from the final reaction product by the usual means, for example by distillation.

The precess can be very usefully applied to hydroperoxides obtained by oxidation of the corresponding hydrocarbons with oxygene or with a gas containing oxygen. It is then possible to extract the hydroperoxide from the crude oxidation solution and to purify it by the usual processes, for example via the sodium salt, before heating it under the conditions described above. The hydrocarbon corresponding to the hydroperoxide employed can then advantageously be used as the solvent.

The new process is also noteworthy in that it is directly applicable to the crude oxidation solutions obtained by oxidising, by means of air, a hydrocarbon of general formula:

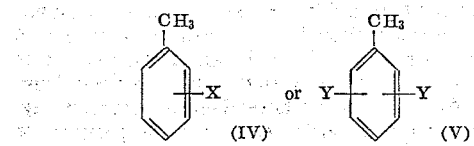

in which X and Y are as defined above. In this case the benefit derived from the new process is the greater when dealing with oxidation products which are prepared in a way such as a favour the formation of the hydroperoxide, the proportion of undesirable products in the starting material thus being a minium. In practice, it is generally more advantageous to start from an oxidation product obtained by liquid phase oxidation of a hydrocarbon of Formula IV or V with air, without a catalyst, optionally in the presence of initiators and of stabilisers for the hydroperoxides, and under pressure, with the temperature and the degree of conversion being so chosen as to limit the production of undesirable products to the maximum extent. Of course, the oxidation process is carried out in an apparatus which does not catalyse the decomposition of the hydroperoxide; in the case of a steel apparatus this presupposes a prior passivation, for example with pyrophosphates. When the oxidation product is particularly prepared to obtain hydroperoxide, the oxidation is generally restricted to a content of oxidation products in the solution of less than 10%, preferably from 2% to 7%. As well as the hydroperoxide these oxidation products contain the corresponding aldehyde and alcohol as well as various by-products such as acids and esters. The oxidation product can be brought to any desired concentration before being subjected to the treatment according to the invention. However, since the reaction is exothermic, there is advantage in not using excessively concentrated solutions, in order to avoid excessive heat evolution which is prejudicial to good yields being obtained. In practice, there is no value in seeking to employ solutions of the oxidation product having a concentration of more than 15% of total peroxides. Since the oxidation is frequently carried out under pressure, a simple means of concentrating the oxidation product thus produced is to allow the hot oxidant product issuing from the oxidation reactor to expand. Acids present in the oxidation product, whether it has been pre-concentrated or not, can optionally be removed, for example by washing with water or by means of an aqueous solution of an alkali metal bicarbonate.

The following examples illustrate the invention.

EXAMPLE 1

50 g. of a toluene solution containing 3 g. of benzyl hydroperoxide of 88.2% purity are introduced into a 100 cm.³ flask provided with a reflux condenser. 0.0437 g. of chromium naphthenate containing 5.1% by weight of metal, followed by 0.18 g. of pyridine, are added thereto. The mixture is then raised to the boil (110° C.) and refluxed for 1 hour. After cooling, the reaction mixture is washed with 5 cm.³ of dilute hydrochloric acid and then with 5 cm.³ of water, 2 g. of benzaldehyde and 0.46 g. of benzyl alcohol are determined in the remaining organic phase.

The hydroperoxide employed was prepared as follows: Toluene is oxidised in the liquid phase at 190° C. at a pressure of 13 bars with air having an oxygen content reduced to 10% of oxygen, with the oxidation being discontinued when the concentration of high-boiling products reaches 4%. After cooling, the oxidation solution is washed with water and then extracted with a 1.5 N aqueous sodium hydroxide solution. The hydroperoxide is liberated from the aqueous phase by adding bicarbonate and is then extracted with toluene. The toluene is then removed by distillation under reduced pressure.

EXAMPLE 2

100 g. of a solution containing 3.9 g. of para-methoxybenzyl hydroperoxide of 76.8% purity in para-methoxytoluene are introduced into a 250 cm.³ flask provided with a reflux condenser. 0.04 g. of chromium naphthenate and 0.16 g. of pyridine are then added. The solution is heated to 110° C. After one hour the hydroperoxide has entirely decomposed. After cooling, the solution is washed as described in Example 1 and 2.65 g. of para-methoxybenzaldehyde and 0.58 g. of para-methoxybenzyl alocohol remain in the residual orgenic phase.

The hydroperoxide employed was prepared as follows:

(a) 1600 g. of para-methoxytoluene containing 1.6 g. of t-butyl perbenzoate and 1.24 g. of the disodium salt of ethylene diamine tetraacetic acid are oxidised in a borosilicate glass apparatus at 160° C. with air (at 200 l./hour) which has a reduced oxygen content to 10%. The oxidation is stopped after 1 hour 30 minutes. 1483.5 g. of a solution containing 4.65% by weight of oxidised products are thus obtained. Its para-methoxybenzyl hydroperoxide content is 3.12%.

(b) The oxidation solution is cooled to 0° C. and extracted with 315 cm.³ of a 2 N aqueous sodium hydroxide solution. A solution of 63 g. of sodium bicarbonate in 770 cm.³ of water is added to the aqueous layer and the mixture is then extracted with 200 cm.³ of diethyl ether. The solvent is then removed by distillation under reduced pressure.

EXAMPLE 3

1332.8 g. of a solution prepared by the oxidation of para-methoxytoluene and containing 41.5 g. of para-methoxybenzyl hydroperoxide and 22 g. of various oxidation products, including 4.4 g. of para-methoxybenzaldehyde and 3.2 g. of para-methoxybenzyl alcohol, are introduced into a 2-litre flask provided with a distillation column and a collecting system. 2.45 g. of pyridine and 0.56 g. of chromium naphthenate are added thereto. The whole is then heated to 110° C. for 1 hour. The greater part of the para-methoxytoluene is then removed by distillation under 30 mm. of mercury, and the residue is subjected to distillation at 1.5 mm. of mercury. The fraction boiling in the range from 72°–100° C. under 1.5 mm. of mercury is retained. This contains 36 g. of para-methoxybenzaldehyde, 7.8 g. of para-methoxybenzyl alcohol and 3.6 g. of para-cresol. 12.8 g. of by-products containing 54.2% by weight of carbon remain. The yield of para-methoxybenzaldehyde and para-methoxybenzyl alcohol is 70.5% based on the para-methoxytoluene consumed.

The solution of hydroperoxide employed was prepared by oxidation of para-methoxytoluene according to Example 2(a) followed by washing with an aqueous solution containing 7% of sodium bicarbonate and drying by heating to 70° C. for 35 minutes under a reduced pressure of 10 mm. of mercury.

EXAMPLE 4

A solution containing 2.73 g. of para-methylbenzyl hydroperoxide of 92.3% purity, 0.2 g. of pyridine and 0.047 g. of chromium naphthenate in para-methyltoluene (p-xylene) is heated to 110° C. for 1 hour in a 100 cm.³ flask provided with a reflux condenser. After cooling, the mixture which remains is washed in the manner indicated in Example 1. Finally, 2.01 g. of para-methylbenzaldehyde and 0.33 g. of para-methylbenzyl alcohol remain in the organic phase.

The hydroperoxide employed was prepared in the following manner. 400 g. of p-xylene containing 0.054 g. of sodium pyrophosphate and 0.45 g. of butyl perbenzoate are oxidised at 130° C. in a borosilicate glass vessel with air (at 9 l./hour) which has been depleted to 10% oxygen content. The oxidation is stopped after 6 hours. 373 g. of a solution containing 8.3% by weight of oxidised products are thus obtained. Its hydroperoxide content is 4.97%. The hydroperoxide is extracted in the manner indicated in Example 2(b), using 155 cm.³ of 1.6 N sodium hydroxide solution in the presence of 370 cm.³ of hexane, 25.5 g. of bicarbonate and 240 cm.³ of diethyl ether.

EXAMPLE 5

980 g. of a solution prepared by the oxidation of toluene containing, by weight, 1.9% of benzyl hydroperoxide, 0.58% of benzyl alcohol and 0.31% of benzaldehyde are introduced into a 2 litre flask provided with a distillation column and a collecting system. 0.95 g. of a toluene solution of a CrO₃·2C₅H₅N complex containing 1.04% by weight of metal are added thereto, and the whole is then raised to the boil (110° C) whilst the water produced is simultaneously removed by distilling the water-toluene azeotrope.

Under these conditions, the hydroperoxide is practically completely decomposed after 1 hours. The greater part of the toluene is removed by distillation and, after cooling, 12.1 g. of benzaldehyde and 4.2 g. of benzyl alcohol remain in the residual mixture.

The hydroperoxide solution employed was prepared by oxidation of toluene in the liquid phase at 190° C. under a pressure of 13 bars with air containing a reduced oxygen content of 10% oxygen and with the oxidation being discontinued when the concentration of high-boiling products reaches 4%. The solution was then washed with water, using 200 cm.³ per kg. of solution, and dried by heating and distilling the water-toluene azeotrope.

We claim:

1. A process for the preparation of a mixture of an aromatic aldehyde with the corresponding aromatic alcohol which comprises heating a solution of a primary araliphatic hydroperoxide of the formula:

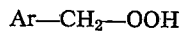

Ar—CH₂—OOH where Ar represents an unsubstituted phenyl radical or a phenyl radical substituted by one halogen, alkyl of 1 to 4 carbon atoms, alkoxy of 1 to 4 carbon atoms, nitrile (CN) or nitro radical or a phenyl radical substituted by two alkyl radicals of 1 to 4 carbon atoms, in a hydrocarbon solvent free of unsaturation other than aromatic unsaturation in the presence of an organic base which is an aliphatic, alicyclic, aromatic or heterocyclic amine having at least one secondary or tertiary nitrogen atom and in the presence of a chromium compound having a solubility of at least 0.1 g./litre at ambient temperature in the hydrocarbon solvent present in an amount corresponding to 0.01 to 1.5 g. combined chromium per kg. of hydroperoxide, the reaction temperature being from 50 to 180° C.

2. The process according to claim 1 in which the solvent is (a) an alkane of 6 to 20 carbon atoms, or
   (b) a cycloalkane of 6 to 16 carbon atoms in the ring and which may optionally be substituted in the ring by alkyl of 1 to 4 carbon atoms, or
   (c) benzene which may optionally be mono- or poly-substituted in the ring by (i) halogen, (ii) alkyl of 1 to 4 carbon atoms (iii) alkoxy of 1 to 4 carbon atoms (iv) nitrile or (v) nitro or (vi) phenyl or (vii) phenyl mono-substituted by halogen, alkyl of 1 to 4 carbon atoms, alkoxy of 1 to 4 carbon atoms, nitrile or nitro or (viii) phenyl di-substituted by alkyl each of 1 to 4 carbon atoms, or
   (d) tetrahydronapthalene or decahydronapthalene.

3. The process according to claim 1 in which the organic base is pyridine, a picoline, a lutidine, a collidine, bipyridyl, piperidine, quinoline, isoquinoline, acridine, morpholine, phenothiazine, pyrimidine, pyrazine, piperazine or a dialkylaniline.

4. The process according to claim 1 in which the concentration of the organic base employed is from 1 to 15% by weight of the hydroperoxide.

5. The process according to claim 1 in which the chromium compound is a chromium (III) carboxylate, a chromium (VI) ester, a chromium 1,3 - ketoenolate, a chromium carbonyl derivative a complex formed by chromium (VI) oxide with a nitrogen-containing base or a chromium (VI) carboxylate.

6. The process according to claim 5 in which the chromium compound is chromium octanoate, chromium naphthenate, chromium stearate, chromium acetylacetonate or CrO₃(C₅H₅N)₂.

7. The process according to claim 1 in which the hydroperoxide concentration is from 2 to 20% by weight of the solvent.

References Cited

UNITED STATES PATENTS 3,387,036  6/1968  Bonnart et al. _____ 260—599
3,410,903  11/1968  Solomon _____ 260—618 C BERNARD HELFIN, Primary Examiner U.S. Cl. X.R.

260—599, 600, 613 D, 618 C